Patented Oct. 28, 1930

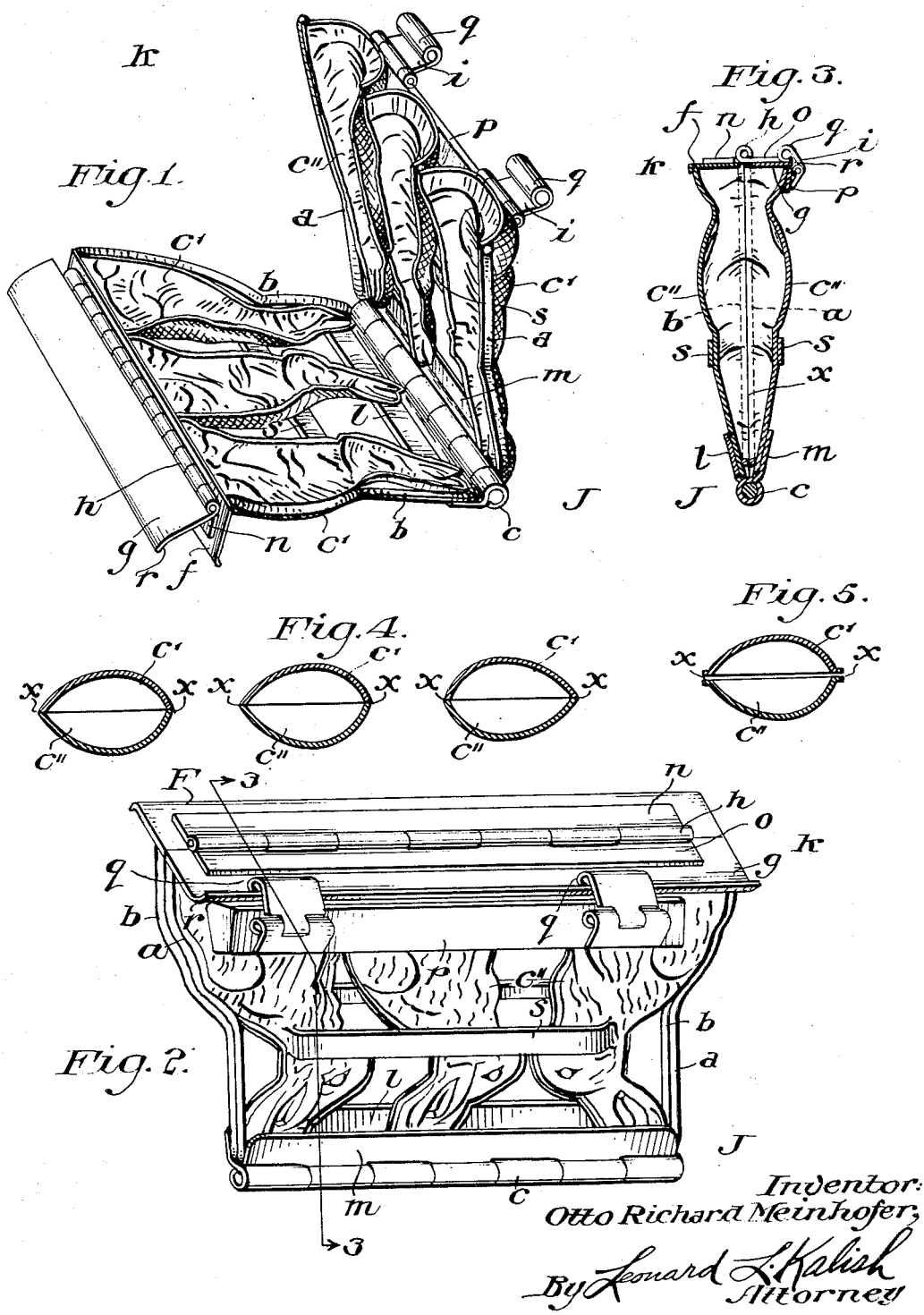

1,780,091

UNITED STATES PATENT OFFICE

OTTO RICHARD MEINHÖFER, OF DRESDEN, GERMANY

MOLD FOR THE MANUFACTURE OF CHOCOLATE ARTICLES

Application filed February 3, 1928. Serial No. 251,718.

My invention relates to chocolate molds, and it relates more particularly to molds adapted for the formation or production of hollow molded chocolate figures or objects.

My invention further relates to hollow-figure chocolate molds of the type in which the molding space is completely enclosed in the operative condition, and in which the molding space is adapted to receive a volume of moldable chocolate less than the volume of the molding space, which chocolate is then distributed uniformly throughout the interior surface of the fully enclosed molding chamber and "set" in such uniformly distributed condition by the suitable rotation or turning of the mold in various directions and the simultaneous cooling of the same by such means for instance, as the hollow chocolate molding machine disclosed in the United States Patent No. 1,576,149, issued to Richard Siegert on March 9th, 1926.

One of the objects of my present invention is to provide a chocolate mold of the character stated, from which the finished, hollow molded chocolate piece or figure may be removed "clean", that is, without any of the undesirable "fins" of chocolate projecting from the finished product along the parting line of the mold. In chocolate molds of this character it has been the practice heretofore to form the several separable sections of the mold with substantial metallic flanges extending parallel to the parting plane of the mold;—with the flanges of the opposed separable mold sections being adapted to abut each other in the closed condition of the mold. This prior practice, particularly in "gang molds", that is, molds having a series of successive molding spaces or molding chambers for the simultaneous molding of a corresponding series of hollow chocolate pieces, not only gave rise to undesirable chocolate "fins" formed on the chocolate pieces along the parting plane of the mold, which required an additional subsequent operation for the removal thereof, but this prior practice also caused the formation of a chocolate layer between opposite flanges of the mold, which tended to spread the mold apart more and more as the chocolate layer or encrustation on the flanges increased, and which eventually distorted the entire mold and caused a wastage of chocolate.

By the prior practice in molds of this character the flanges formed on the several separable sections of the mold, also constituted undesirable obstructions or barriers to the free circulation of air completely about each and every one of the molding spaces or chambers, particularly during the cooling of the mold, so that the greatest uniformity and the desired speed of cooling is not obtainable by this prior practice.

It is therefore a further object of my present invention to provide hollow chocolate molds of the character stated, either of the individual type, having but a single molding space or molding chamber therein, or, of the multiple or "gang" type having a series of similar molding spaces or molding chambers arranged in a row, with the corresponding separable sections of the series of molding chambers being connected in corresponding rows and movable in unison;—in which each molding chamber or molding space is formed by a pair of operatively juxtaposed and co-acting separable mold sections, each terminating in relatively thin edges, which in the closed relationship of said mold sections are adapted generally to abut each other, throughout, except at the basal portion of the molding chamber or molding space, which is left open by said pair of juxtaposed and co-acting mold sections in the closed relation thereof, and a closure plate movable with respect to the pair of juxtaposed mold sections and adapted to close the basal portion of the molding chamber.

The further object of the foregoing hollow chocolate mold of my novel construction is thereby to provide molding chambers from which any chocolate leakage or chocolate extrusion will drop off by itself without the formation of any chocolate "fins" or encrustations along the parting plane or juncture plane of the mold, and around which molding chamber a maximum freedom of air circulation is obtainable, and within which molding chamber the chocolate may be cooled most uniformly throughout its outer surface.

A still further object of my present invention is a hollow chocolate mold of the character hereinabove stated, either having a single molding chamber, or of the multiple or "gang" type, in which the filling of the chocolate into the molding chambers is greatly facilitated, and whereby the spilling and wastage of the chocolate incidental to the filling operation, is reduced to a minimum.

A still further object of my invention is to provide a hollow chocolate mold of the character stated, of the multiple or "gang" type in which the successive mold sections in each of the pair of juxtaposed rows, is not supported nor connected with the adjacent mold sections of the row by any undesirable and objectionable metal flanges intermediate the successive mold sections, but which mold sections are nevertheless otherwise securely supported and kept in alignment, and whereby any distortion or warping and resultant misalignment of the mold is reduced to a minimum, if not entirely eliminated.

Other objects of my invention will appear further from the following detailed description.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, in which like reference characters indicate like parts.

Figure 1 represents a perspective view of a multiple or "gang" mold embodying my invention, shown in an open condition.

Figure 2 represents a perspective view of the same mold, shown in the completely closed condition with the basal portion on top.

Figure 3 represents a section on line 3—3 of Figure 2.

Figure 4 represents a section taken generally on line 4—4 of Figure 2.

Figure 5 represents a section through one of the molding chambers, which may be taken generally on line 4—4 of Figure 2, illustrating however, a slightly modified form of edge construction on the separable sections of the mold.

According to my present invention, as will be seen from the drawings, the juxtaposed and separable mold sections $c'$ and $c''$ which form a molding space or molding chamber for containing the chocolate mass when the mold is closed, are each formed independently, and, as shown in the drawings, are carried rigidly and supported by the corresponding frames $a$ and $b$ respectively. The juxtaposed and abutting edges $x$ are cut off sharply and fit closely together so that, when the mold is closed, a tight joint is formed where the edges abut against one another at $x$, which tends to prevent the extrusion or leakage of any chocolate at this joint. Should, however, any chocolate extrude or leak through the edge-to-edge joint formed at $x$, it will have no detrimental effect, because it can form no appreciable "fin" or layer of chocolate in the parting plane of the mold. It will be seen that the "fin" which can form with a mold of this construction will only be quite negligible, so that there will be no necessity for putting the finished chocolate pieces through a separate operation for removing the "fins". Even if the two sections $c'$ and $c''$ of the mold are provided at $x$ with a small flange, as shown in the drawings, the advantages of the present invention will still be sufficiently maintained for all practical purposes, since, even with a slight marginal flange, no appreciable fin will be formed on the finished chocolate piece, and any chocolate mass extruded at $x$ passes directly to the outside and can therefore not form an encrustation on the juxtaposed surfaces which are adapted for generally abutting contact with each other in the closed condition;— which would prevent the mold from closing satisfactorily, and which tend to cause an ultimate distortion or warping of the mold.

The individual juxtaposed mold sections $c'$ and $c''$ are formed of sheet metal by stamping from suitable dies. In order to retain the juxtaposed mold sections $c'$ and $c''$, or juxtaposed rows of a series of said mold sections $c'$ and $c''$, in accurate operative alignment with each other, the opposite rows of mold sections $c'$ and $c''$ respectively, are mounted in corresponding frames $a$ and $b$ respectively.

The "gang" frames $a$ and $b$ are "skeleton" type frames which offer little impedance to the circulation of air around and through the "gang" mold, and which frames may be variously formed. In the particular embodiment shown in the drawings, each of the two opposed frames $a$ and $b$ consists of corresponding wires formed around the three edges, to wit, the two sides and the bottom edge of the two halves of the mold. The wire frames $a$ and $b$ are soldered or otherwise affixed to each of the series of mold sections $c'$ or $c''$ in the row, at suitable contact points. Along one edge of the mold, and preferably along the edge $j$, which is directly opposite to the basal portion $k$ of the mold, a hinge $e$ of suitable length is provided, for hingedly joining the two sections $c'$ and $c''$ of the mold to each other, with the individual mold sections $c'$ and $c''$ of each pair in operative alignment with each other. The hinge $e$ is preferably secured by soldering or otherwise affixing one of its two leaves $l$ and $m$ to each of the two halves of the mold along the edge $j$. By this means the leaves $l$ and $m$ of the hinge $c$ serve to augment the frame members $a$ and $b$ along the edge $j$ of the mold, and become in the nature of frame members, serving to hold the individual mold sections $c'$ and $c''$ in corresponding opposed rows. One side of the mold carries a stationary base plate $f$ at its basal end $k$, which is affixed to each of the mold sections $c'$ on that side of the mold, by soldering or the like, and forms one-half of the basal wall of the molding chambers. The stationary or fixed base plate $f$, in the particular embodiment of my invention as shown, also serves in the nature of a frame member, securely to retain the basal ends of the mold sections $c'$ in alignment.

In order to permit the filling of the chocolate into the molding chambers or spaces, through the basal ends $k$ of the molding chambers, that is, in order to permit the filling of the mold with the sections $c'$ and $c''$ in abutting relation to each other, a movable base plate $g$ is provided to close the basal ends $k$ of the mold sections $c''$. The movable base plate $g$ is preferably hingedly secured to the stationary or fixed base plate $f$ by a suitable hinge $h$;—the two leaves $n$ and $o$ of which are soldered or otherwise affixed to the stationary base plate $f$ and the movable base plate $g$ respectively. The mold is thus filled with the sections $c'$ and $c''$ in closed or abutting relation to each other and with the movable base plate $g$ swung open. Thereafter the movable base plate $g$ is closed down into the position shown in Figure 2, whereby the molding chambers are fully enclosed.

In order to lock the movable base plate $g$ to the basal portion of the mold sections $c''$, and in order also to lock the entire mold in the closed or operative condition, one or more clamp members $i$ are provided, hingedly secured to a common transverse frame member $p$, and including the beaded terminal portions $q$, which are adapted to be snapped over the slightly upturned edge $r$ of the movable base plate $g$. The frame member $p$ extends across one side of the mold near the basal portion thereof, and is affixed, by soldering or otherwise, to each of the mold sections on that side of the mold, at a suitable contact point.

In order to increase the rigidity of the mold sections $c'$ and $c''$ and to insure their permanent alignment, a reinforcing bar $s$ may be extended across each side of the mold;—soldered to each of the mold sections at suitable contact points. The reinforcing bars $s$ are disposed intermediate of and substantially parallel to the hinge $c$ and the base plates $f$ and $g$, so as to give support and rigidity to the portions of the mold sections intermediate their hinged and basal ends.

The advantages of my novel mold construction are several. The chocolate pieces may be produced without any "fins", by reason of the elimination of all substantial areas of opposed abutting surfaces in the parting plane of the mold. By this means also the useful life as well as the efficiency of the mold is greatly increased, by preventing the formation of layers or crusts of chocolate in the parting plane of the mold which would tend to spread and distort the mold. By reason of the segregation or separation of the mold sections which form the successive molding chambers or molding spaces, the possible air circulation about the mold chambers is increased to a maximum, and the uniformity of cooling of the mold is also increased. This efficiency in the cooling of the mold is further augmented by the provision of "skeleton" type supporting frames and by the attachment of all supporting frame members, such as the frame members $a$ and $b$, the hinge leaves $l$ and $m$, and the reinforcing bars $p$ and $s$, through contact points of comparatively small area, so that a nearly uniform wall thickness may be maintained around each of the molding chambers, thus insuring a more uniform cooling throughout the entire chocolate piece.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent is:—

1. A chocolate mold adapted for making chocolate figures or pieces from initially fluid chocolate having a basal portion and comprising a pair of juxtaposed and co-acting mold sections, each terminating in relatively thin edges, which, in the closed relationship of said mold sections, are adapted generally to abut each other throughout, except at the basal portion of said mold which is left open by said pair of juxtaposed and co-acting mold sections when in the closed relation;— said pair of juxtaposed and coacting mold sections being hingedly secured to each other, and a base plate hingedly secured to one of said mold sections at a point opposite to the hinge which secures the pair of mold sections to each other, said base plate being adapted to close the basal portion of the mold, and having means for detachable locking engagement with the other of said mold sections for locking the pair of mold sections in closed relation to each other and for locking the base plate in closed relation to the basal portion of said mold.

2. A multiple chocolate mold adapted for making chocolate figures or pieces from initially fluid chocolate having a basal portion and comprising two juxtaposed series of mold sections arranged in coacting and aligned pairs, each mold section terminating in relatively thin edges; said thin edges of each pair, in the closed relationship of said mold sections, being adapted generally to abut each other throughout except at the basal portion of said mold which is left open by each of said pairs of coacting mold sections when in the closed relation;—said two juxtaposed series of mold sections being hingedly secured to each other, a base plate hingedly secured to one of said series of mold sections at a point opposite to the hinge which secures the two series of mold sections to each other, said base plate being adapted to close the basal portion of the mold, and a brace extending across each of said series of mold sections intermediate the hinge which secures the two series of mold sections to each other and the basal portion of the mold.

3. A chocolate mold adapted for making chocolate figures or pieces from initially fluid chocolate having a basal portion at one end thereof and comprising a pair of juxtaposed and co-acting mold sections the walls of which converge towards each other from their basal ends toward their opposed ends and the walls of which are of generally uniform thickness and terminate in relatively thin edges, which, in the closed relationship of said mold sections are adapted generally to abut each other throughout except at the basal portion of said mold, which is left open by said pair of juxtaposed and co-acting mold sections when in the closed relation;— said pair of juxtaposed and coacting mold sections being hingedly secured to each other at their converging ends, a base plate movable with respect to the mold and adapted to close the basal portion thereof, and means for detachable locking engagement between the base plate and the mold, for locking the pair of mold sections in closed relation to each other and for locking the base plate in closed relation to the basal portion of said mold.

4. A multiple chocolate mold adapted for making chocolate figures or pieces from initially fluid chocolate comprising two juxtaposed series of mold sections arranged in co-acting and operatively opposed and aligned pairs, the mold sections of each of the two juxtaposed series being segregated from each other so as to form clearance spaces intermediate adjacent molding chambers of said multiple mold, to facilitate the free passage and circulation of heat transfer fluids and mediums through the multiple mold and around the individual molding chambers thereof, a skeleton frame around each of said juxtaposed series of mold sections for supporting the mold sections of each of the two series respectively, in alignment with each other and in alignment with the corresponding coacting mold sections of the juxtaposed series, and adapted to offer minimum impedance to the passage of a fluid heat transfer medium through and around the multiple mold and the individual mold chambers thereof, means extending along one of the ends of the mold sections of each of the two juxtaposed series, for movably securing to each other said two series of mold sections, and means for holding the mold sections in closed relation to each other.

5. A multiple chocolate mold adapted for making chocolate figures or pieces from initially fluid chocolate, having a basal portion and comprising two juxtaposed series of mold sections arranged in co-acting and aligned pairs, each of the two juxtaposed series of mold sections being supported by a corresponding skeleton frame which connects the two ends of each section to the corresponding two ends respectively of each of the other sections in the series;—each mold section terminating in relatively thin edges; and said thin edges of each pair, in the closed relationship of said mold sections, being adapted generally to abut each other throughout except at the basal portion of said mold which is left open by each of said pairs of coacting mold sections when in the closed relation;— said two juxtaposed series of mold sections being hingedly secured to each other, and a base plate hingedly secured to one of said series of mold sections at a point opposite to the hinge which secures the two series of mold sections to each other, said base plate being adapted to close the basal portion of the mold.

6. A multiple chocolate mold adapted for making chocolate figures or pieces from initially fluid chocolate, comprising two juxtaposed series of mold sections arranged in co-acting and operatively opposed and aligned pairs, the mold sections of each of the two juxtaposed series being segregated from each other so as to form clearance spaces intermediate adjacent molding chambers of said multiple mold, to facilitate the free passage and circulation of heat transfer fluids or mediums through the multiple mold and around the individual molding chambers thereof, a skeleton frame corresponding to each of said two juxtaposed series of mold sections, and connecting to each other the mold sections of each of said juxtaposed series respectively, for supporting said mold sections of each of said two series respectively, in alignment with each other and in alignment with the corresponding coacting mold sections of the juxtaposed series, said skeleton frames being adapted to offer minimum impedance to the passage of a fluid heat transfer medium through and around the multiple mold and the individual mold chambers thereof, a hinge extending along one of the ends of the mold sections of each of the two juxtaposed series, for movably securing to each other said two series of mold sections, and means for holding the mold sections in closed relation to each other.

7. A multiple chocolate mold adapted for making chocolate figures or pieces from initially fluid chocolate, having a basal portion and comprising two juxtaposed series of mold sections having relatively thin edges and arranged in co-acting and operatively opposed and aligned pairs, which, in the closed relationship of the mold, form corresponding molding chambers or spaces open at their basal portions;—the mold sections of each of the two juxtaposed series being segregated from each other so as to form clearance spaces intermediate adjacent molding chambers of said multiple mold, to facilitate the free passage and circulation of heat transfer fluids and mediums through the multiple mold and around the individual molding chambers thereof, a skeleton frame corresponding to each of said two juxtaposed series of mold sections, and connecting to each other the mold sections of each of said juxtaposed series respectively, for supporting said mold sections of each of said two series respectively, in alignment with each other and in alignment with the corresponding coacting mold sections of the juxtaposed series, said skeleton frames being adapted to offer minimum impedance to the passage of a fluid heat transfer medium through and around the multiple mold and the individual mold chambers thereof, means extending along one of the ends of the mold sections of each of the two juxtaposed series, for movably securing to each other said two series of mold sections, and a base plate movable with respect to the mold and adapted to close the basal portions thereof and adapted to hold the mold sections in closed relation to each other.

In testimony whereof I have signed my name to this specification.

OTTO RICHARD MEINHÖFER.